United States Patent Office 3,066,016
Patented Nov. 27, 1962

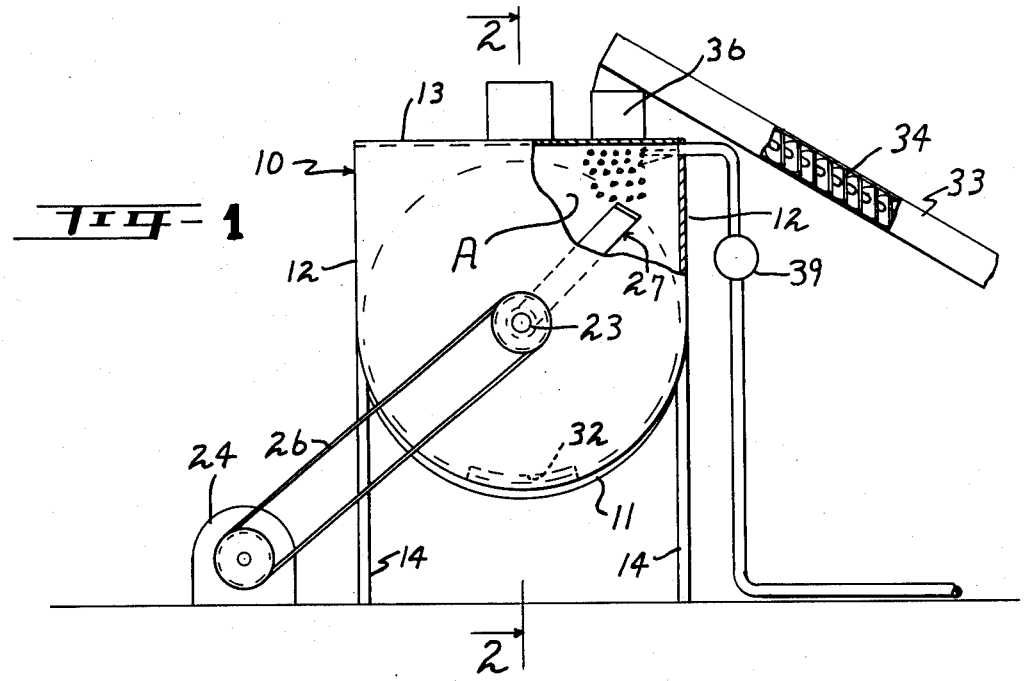
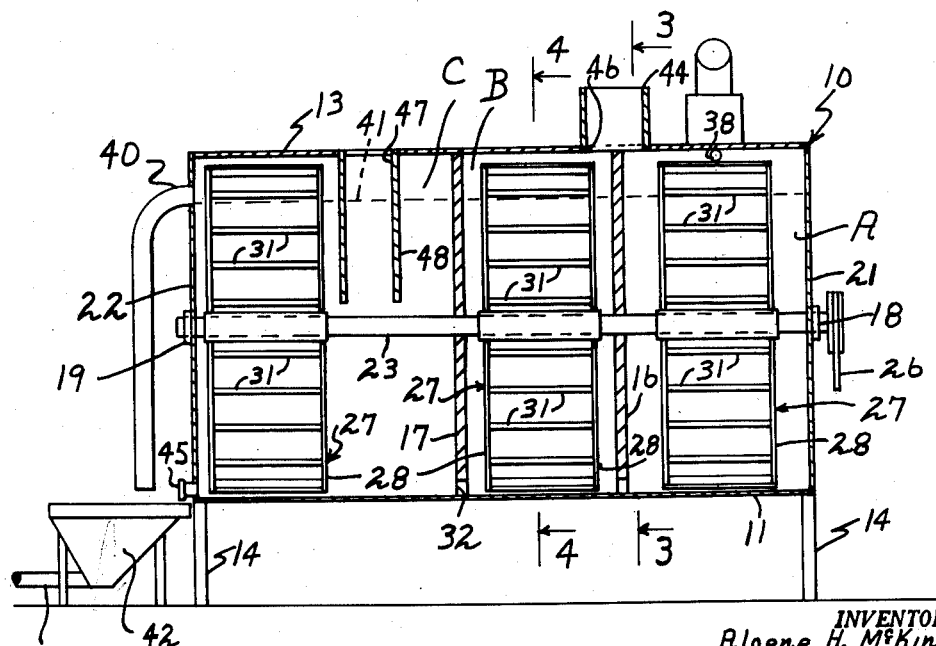

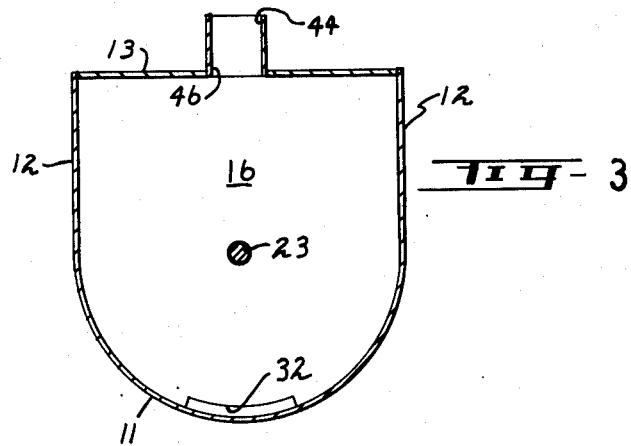
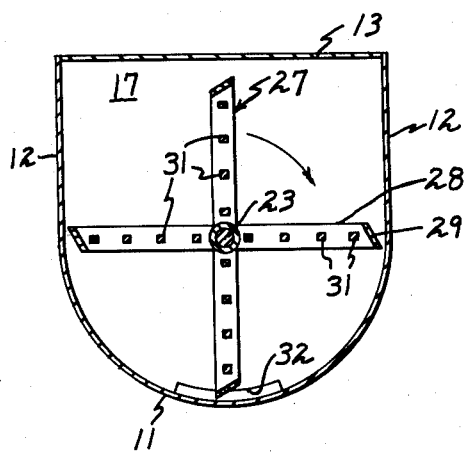

3,066,016
APPARATUS FOR SLAKING LIME
Algene H. McKinley and David T. Underwood, Jr., Birmingham, Ala., assignors of one-third to Floyd W. Bischoff and Delmar F. Bischoff, jointly
Filed July 13, 1960, Ser. No. 42,659
1 Claim. (Cl. 23—287)

Our invention relates to apparatus for slaking lime and has for an object the provision of such apparatus especially adapted to produce lime putty or milk of lime from pebble quick-lime, of any desired flowing consistency, and in a continuous manner.

An object of our invention is to provide a lime slaking apparatus in which the quick-lime is delivered at a controlled rate to our improved machine which comprises generally an elongated tank having a curved bottom, the lime and water for hydration being delivered at one end thereof into a first or primary mixing compartment in which there is a mixing paddle or wheel and then flows to a second mixing compartment under a baffle separating the two compartments, whereby the output of the machine may be regulated by the difference in hydrostatic head of the liquid between the feed and discharge ends, as will later appear.

Another object is to introduce the quick-lime into the first compartment by dropping it into a feed opening and to strike the falling, dry lime with a generally horizontally directed stream of water, thereby intimately to wet the particles and to aid in breaking them up before they drop into the first mixing compartment, thus greatly reducing the danger of submerging large particles which would "explode" due to sudden reaction.

Another object is to provide apparatus of the character designated in which there are at least two mixing chambers and a final stirring and discharge chamber, there being baffles between the compartments with holes at the lower ends thereof through which the mixture passes from the first to the second and thence to the last compartment, together with mixing paddles so designed as to impart rotational movement to the mix without moving it longitudinally of the tank, whereby the rate of flow through the machine is a constant depending upon the input of quick lime and water and a predetermined slight amount of slope from the feed to the discharge end of the tank.

Other objects are to provide apparatus of the character designated in which the first and second mixing compartments are vented, preferably by providing an opening through the top of the tank over the baffle dividing said compartments; to provide agitators or paddle wheels which do not become clogged or coated with material; and in general, to provide a continuous slaker of small size and high capacity which is extremely simple and rugged in construction.

Briefly, our improved apparatus comprises an elongated tank having a rounded bottom and a cover plate. The tank is set so that there is a slight slope from the feed end toward the discharge end. The tank is divided into three compartments by the provision of two baffles made substantially fluid-tight to the inside of the tank. Adjacent the bottom of the tank the baffles have openings therein of predetermined size. Each compartment is provided with a rotary paddle wheel so constructed as to impart only rotational movement to the mix, but no longitudinal movement. The quick-lime is dropped into the first opening, generally over the paddle wheel, above the liquid level. A stream of water is directed into the first compartment in such manner as to strike the cascading or falling particles of quick-lime. This wets the particles to an appreciable degree and tends to break them up. With the machine in full operation, that is, with the compartments full and with water and quicklime being delivered, the compartments gradually fill up to that level determined by the difference in the hydrostatic heads between the feed end compartment which is slightly higher than the discharge one. Under such conditions the final lime putty or milk of lime is delivered by gravity through an opening at the top of the last compartment. The last compartment also contains a mixing wheel or paddle. By properly proportioning the rate of infeed of the water and quick-lime to the total volume of the tank, we are able to provide a definite time cycle from the time of entry of the particles into the machine until they are delivered. In order to facilitate cleaning the tank and to cause insoluble particles to proceed to the discharge compartment, we slope the tank slightly from the feed end to the discharge end. With the paddle wheels all rotating at a given rate it will thus be apparent that we subject the particles to a uniform, given amount of agitation and wetting and deliver a continuous stream of properly slaked lime from the apparatus.

Apparatus illustrating features of our invention is shown in the accompanying drawings, forming a part of this application, in which:

FIG. 1 is an end elevational view, partly broken away and in section;

FIG. 2 is a detail sectional view taken generally along line 2—2 of FIG. 1;

FIG. 3 is a detail sectional view taken along line 3—3 of FIG. 2; and,

FIG. 4 is a detail sectional view taken generally along line 4—4 of FIG. 2.

Referring now to the drawings for a better understanding of our invention it will be seen that our improved apparatus comprises generally a tank indicated by the numeral 10 and having a curved bottom 11. The vertical side walls 12 of the tank may be joined tangentially to the curved bottom 11. A cover plate 13 is provided over the tank. The tank may be supported in any suitable manner as from the supports indicated at 14. As will later appear, the feed end of the tank preferably is slightly higher than the discharge end thereof.

It will be seen that the tank is divided into compartments A, B and C. That is, we provide a baffle 16 between the compartments A and B and a similar baffle 17 between the compartments B and C. The baffles are made substantially fluid-tight to the inner side walls of the tank in any suitable manner.

Extending through the tank and mounted on suitable bearings and seals 18 and 19 in the end walls 21 and 22 is a shaft 23. The shaft 23 may be driven from a motor 24 through a belt 26 and suitable pulleys.

Mounted on the shaft 23 in the compartments A, B and C are paddle wheels or agitators 27. In view of the fact that the agitators may all be substantially identical, a description of one will suffice for all. From a consideration of FIG. 4 it will be seen that the paddle wheels comprise arms 28 which carry on their outer ends flat, sloping blades 29. Intermediate the shaft 23 and the blades 29 are square bar type agitators or stirrers 31. It will be understood that each of the agitators 27 comprises spaced sets of the arms 28 and that the bars 31 extend therebetween.

The baffles 16 and 17 are provided adjacent the bottom 11 of the tank with openings indicated at 32. The size of these openings is such that they are large enough to permit substantially free flow at a given hydrostatic difference in the compartments and small enough to prevent any reverse flow of material. The openings are elongated width-wise of the tank so that material passing therethrough lies close to the bottom of the tank.

At 33 we illustrate one form of apparatus for conveying the quick-lime to our improved machine at a controlled rate. This may be in the form of a screw conveyor tube 33 with a screw conveyor 34 therein. Pebble quick-lime is delivered up the tube by the screw conveyor from a source of supply, not shown, into a hood 36 where the material drops through an opening 37 in the top 13 for delivery into the compartment A. It will be apparent that other ways of delivering the material to our apparatus may be employed such for instance as a hopper sitting directly over the opening 37.

Mounted in a side wall 12 of the tank, and beneath the path of the falling quick-lime, is a generally horizontally directed water supply pipe 38. The pipe 38 may be under control of a valve 39 from a source of water under pressure, not shown. As the material falls into compartment A it is struck by the horizontally directed stream of water, thus to wet the particles and to break them up before they fall into the compartment.

At the discharge end of the machine we provide a finished product discharge pipe 40. The pipe 40 is located at the level of the liquid in the compartment C, the level being indicated by the line 41. The material delivered from the pipe 40 by gravity may fall onto a shaking screen indicated diagrammatically at 42 thereby to remove the clinker or other foreign particles from the material. From the screen the material may be delivered through through a line 43 to a storage tank or the like. A drain 45 is provided in the end wall 22 at the bottom of compartment C.

Referring again to the compartments A and B, we preferably vent the same by providing a "chimney" 44 mounted in an opening 46 in the top of the tank 13, over the baffle 16. Also, we may provide another opening 47 in the top 13 of the tank equipped with downwardly projecting baffles or the like extending below the liquid level. This serves the purpose of providing ready means for sampling the material in the final compartment C.

From the foregoing the method of constructing and using our improved apparatus together with the advantages thereof may now be explained and readily understood.

In order that the capacity of our improved apparatus may be more readily understood, the following is cited as a specific example of a form of apparatus that we have used:

Employing a tank that holds approximately 1½ cubic yards when filled to the level indicated by the approximate line 41, and using three compartments with the three agitators therein as shown, we rotate the shaft 23 at approximately 20 r.p.m. With the tank set with its feed end approximately ½ inch above its lower end or discharge end, and with the holes 32 in the baffles approximately 12 sq. inches in area, we are able to produce finished lime putty at the rate of 22 cubic yards in about three hours. At this rate of production we were feeding approximately 2½ pounds of water to 1 pound of quick-lime in pebble form. The overall dimensions of this specific apparatus was a tank 2¾ feet wide, 3 feet from the bottom 11 to the top 13, and 6 feet from end wall 21 to end wall 22. The radius of curvature of the bottom 11 of the tank 10 was 16½ inches. The agitators or stirrers consisted of arms made of steel ¼" x 2" bars, the outer plates 29 thereon were made of steel of ¼" x 3", and there were four of the bars 31 made of square stock ½" x ½". The power required to drive the agitators was approximately 1 H.P. The outlet pipe 40 was set approximately 2 inches lower than the top-most arc of the agitator blades.

From the foregoing it is apparent that we have devised an improved apparatus for slaking lime in a continuous manner. It will be understood that by sampling through the opening 47 the operator can immediately determine whether or not he is using too much or too little water in proportion to the quick-lime. Further, by employing agitators which impart no longitudinal movement to the particles from compartment to compartment, we are able accurately to determine the time cycle for a given particle from its time of entry to its time of discharge from the apparatus. That is, instead of attempting to force the material through by mechanical motion, we rely upon the difference in hydrostatic head in the compartment A and the compartment C. Since all of the material passing from compartments A to B is forced to go through the openings 32, we obtain intimate mixture of the particles without the danger of any of them passing over the baffles prior to being properly stirred and mixed and wetted.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claim.

What we claim is:

In apparatus for slaking lime, an elongated tank having a generally semi-circular bottom, baffles in the tank dividing it into inlet, intermediate and final compartments, the tops of the inlet and intermediate compartments being vented to atmosphere, there being openings through said baffles adjacent the bottom of the tank for the passage of material from the inlet compartment to the intermediate compartment and thence to the final compartment, driven horizontal bar type rotary agitators in each compartment having substantially flat blade-like scraping elements set to engage material in the tank generally edgewise and operating in close proximity to the semi-circular bottom effective to agitate substantially all of the material in each compartment without imparting substantial longitudinal movement thereto, said scraping elements being rotated about a diameter greater than the depth of the material in each compartment whereby the scraping elements emerge from the material during each revolution, thereby to be self-cleaning, means to feed quick-lime and water in controlled amounts to the inlet compartment over the agitator therein, and a discharge opening connected to the final compartment and located at a point slightly below the level of material in the inlet compartment, whereby the material progresses through the apparatus by gravity and at a rate determined in part by the difference in hydrostatic head in the inlet and outlet compartments.

References Cited in the file of this patent

UNITED STATES PATENTS

| | | |
|---|---|---|
| 1,204,700 | Schofield | Nov. 14, 1916 |
| 2,627,668 | Handwerk | Feb. 10, 1953 |
| 2,833,626 | Knibbs et al. | May 6, 1958 |